(12) United States Patent
Wilson-Jones et al.

(10) Patent No.: US 12,371,094 B2
(45) Date of Patent: *Jul. 29, 2025

(54) STEERING COLUMN ASSEMBLY FOR A VEHICLE

(71) Applicants: ZF Automotive Germany GmbH, Alfdorf (DE); ZF Automotive UK Limited, Solihull (GB)

(72) Inventors: Russell Wilson-Jones, Stratford upon Avon (GB); Mark Anthony Wilkes, Birmingham (GB); Lorenz Graeff, Cologne (DE)

(73) Assignees: ZF Automotive Germany GmbH, Alfdorf (DE); ZF Automotive UK Limited, Solihull (GB)

( * ) Notice: Subject to any disclaimer, the term of this patent is extended or adjusted under 35 U.S.C. 154(b) by 194 days.

This patent is subject to a terminal disclaimer.

(21) Appl. No.: 18/296,167

(22) Filed: Apr. 5, 2023

(65) Prior Publication Data
US 2023/0322290 A1    Oct. 12, 2023

(30) Foreign Application Priority Data
Apr. 8, 2022   (GB) ..................................... 2205198

(51) Int. Cl.
*B62D 5/00*   (2006.01)
(52) U.S. Cl.
CPC ................... *B62D 5/003* (2013.01)
(58) Field of Classification Search
CPC ...... B62D 5/003; B62D 5/0406; B62D 5/006; B62D 5/0409; B62D 5/001; B62D 5/0445; B62D 5/0463; B62D 1/16; F16H 1/225

USPC ............................................. 701/41, 42, 43
See application file for complete search history.

(56) References Cited

U.S. PATENT DOCUMENTS

| | | | |
|---|---|---|---|
| 2011/0067945 A1 | 3/2011 | Sonoda et al. | |
| 2013/0257185 A1 | 10/2013 | Akutsu et al. | |
| 2013/0300235 A1 | 11/2013 | Akutsu et al. | |
| 2023/0331281 A1* | 10/2023 | Wilson-Jones | ...... B62D 5/0403 |
| 2023/0331290 A1* | 10/2023 | Morris | ...................... B62D 1/16 |

FOREIGN PATENT DOCUMENTS

| | | |
|---|---|---|
| CN | 215553526 U | 1/2022 |
| JP | H08258278 A | 10/1996 |

* cited by examiner

*Primary Examiner* — Hai H Huynh
(74) *Attorney, Agent, or Firm* — Kristin L. Murphy

(57) ABSTRACT

A steering column assembly for a vehicle comprises a steering column mounted for rotation about its longitudinal axis and configured for attachment to a steering wheel at one end; a first gear connected to the steering column at a location spaced from the end where the steering wheel may be attached and configured to rotate with the steering column; first and second motors; first and second worm screws connected to and rotatable with an output of the first and second motors respectively and engaged with the first gear; and a control arrangement configured to operate the first and second motors. The control arrangement comprises a circuit board located between the first and second worm screws and their respective motors. The circuit board comprises a motor output position sensor for each of the first and second motors.

23 Claims, 3 Drawing Sheets

STEERING COLUMN ASSEMBLY FOR A VEHICLE

CROSS-REFERENCE TO RELATED APPLICATION

This application claims priority to GB Priority Application No. 2205198.1, filed Apr. 8, 2022, the disclosure of which is incorporated herein by reference in its entirety.

TECHNICAL FIELD

The present disclosure relates to steering column assemblies for vehicles and in particular to such assemblies for use with a steer-by-wire hand wheel actuator.

BACKGROUND

In such steer-by-wire arrangements, a handwheel (steering wheel) is connected to one end of a rotatably mounted steering column whose angular displacement is measured to generate a signal which is used to control the orientation of the steered wheels of the vehicle. The arrangement is commonly also provided with an electric motor connected to the steering column to provide a controlled amount of torque in the opposite direction to the torque applied by the driver, in order to provide a sensation of road feel to the driver.

In such arrangements, typically an electric motor under the control of an ECU (electronic control unit) drives a worm screw engaged with a worm gear which rotates with the steering column to which the steering wheel is connected. It is desirable to take steps to bias the worm screw into engagement with the worm gear in order to reduce gear rattle which can occur when the torque and direction of the motor are reversed.

GB 2579374A discloses a steering column assembly for a vehicle, having a rotatably mounted steering column to one end of which a steering wheel is connected. A gear is connected to, and rotates with, the steering column and is engaged by two worm screws, the rotation of each of which is controlled by a respective motor. The motors can be operated in a first mode in which they apply torque to the steering column in opposite directions and in a second mode in which they apply torque to the steering column in the same direction.

It is desirable for the steering column assembly, including the motor(s), associated gearing and ECU, to be as compact as practically possible as the space available for installation is limited and the steering column assembly normally intrudes into the passenger compartment of a vehicle in which it is installed.

SUMMARY

In accordance with a first aspect of the disclosure, a steering column assembly for a vehicle comprises:
  a steering column mounted for rotation about its longitudinal axis and configured for attachment to a steering wheel at one end;
  a first gear connected to the steering column at a location spaced from the steering wheel attachment portion and configured to rotate with the steering column;
  first and second motors;
  first and second worm screws connected to and rotatable with an output of the first and second motors respectively and engaged with the first gear; and
  a control arrangement configured to operate the first and second motors;
  wherein the control arrangement comprises a circuit board located between the worm screws and their respective motor and wherein the circuit board comprises a motor output position sensor for each of the first and second motors.

Each of the outputs of the first and second motors may pass through an aperture in the circuit board.

Each motor output position sensor may be located adjacent to the aperture through which an output of one of the motors passes.

Each motor output position sensor may be annular and the output of each of the first and second motors may pass through a respective motor output position sensor.

The output of each of the first and second motors may carry a magnet which interacts with the respective motor output position sensor.

The control arrangement may comprise an electronic control unit located beyond the end of the steering column remote from the steering wheel attachment end.

The first gear may be connected to the steering column at the opposite end of the steering column from the steering wheel.

The rotational axes of the first and second worm screws may be inclined with respect to a plane extending perpendicular to the rotational axis of the steering column.

By inclining the rotational axes of the first and second worm screws with respect to the steering column, better use is made of the available space. For example, it is possible to locate the control arrangement (e.g. a ECU) beyond the end of the steering column rather than below the motors, which provides more space for the feet of a driver. It also allows the steering assembly to be more easily installed in a vehicle with the steering column at an angle inclined to the horizontal.

The rotational axes of the first and second worm screws may be inclined at substantially the same angle.

In one exemplary arrangement, the first and second worm screws have the same helix angle.

In one exemplary arrangement, the first and second worm screws are oppositely-handed.

The rotational axes of the first and second worm screws may be inclined at substantially the same angle as the helix angle of the worm screws.

The rotational axes of the worm screws may be parallel.

In one exemplary arrangement, the worm screws are positioned on opposite sides of the rotational axis of the first gear, for example at diametrically opposite sides of the rotational axis of the first gear.

In one exemplary arrangement, the first gear is a straight-cut gear.

In one exemplary arrangement, the rotational axes of the first and second worm screws are inclined towards the same side of a plane extending perpendicular to the rotational axis of the steering column.

In one exemplary arrangement, the ends of the first and second worm screws remote from the respective motors are inclined towards the end of the steering column configured for attachment of a steering wheel.

The rotational axes of the worm screws may be oriented substantially vertically in normal use.

The first and second motors may be positioned below the first and second worm screws respectively.

The outputs of the first and second motors may be connected directly to the first and second worm screws respectively.

The steering column assembly may further comprise a circuit board located between the worm screws and their respective motor and each of the outputs of the first and second motors may pass through an aperture in the circuit board.

The circuit board may comprise a motor output position sensor for each of the first and second motors.

Each motor output position sensor may be located adjacent to an aperture through which an output of one of the motors passes.

Each motor output position sensor may be annular and the output of each of the first and second motors may pass through a respective motor output position sensor.

The output of each of the first and second motors may carry a magnet which interacts with the respective motor output position sensor.

In accordance with a second aspect of the disclosure, a vehicle comprises a steering column assembly in accordance with the first aspect of the disclosure.

In one exemplary arrangement, the longitudinal axis of the steering column is inclined to the horizontal.

BRIEF DESCRIPTION OF DRAWINGS

By way of example only, specific exemplary arrangements of the present disclosure will now be described with reference to the accompanying drawings, in which.

DETAILED DESCRIPTION

Figure 1:
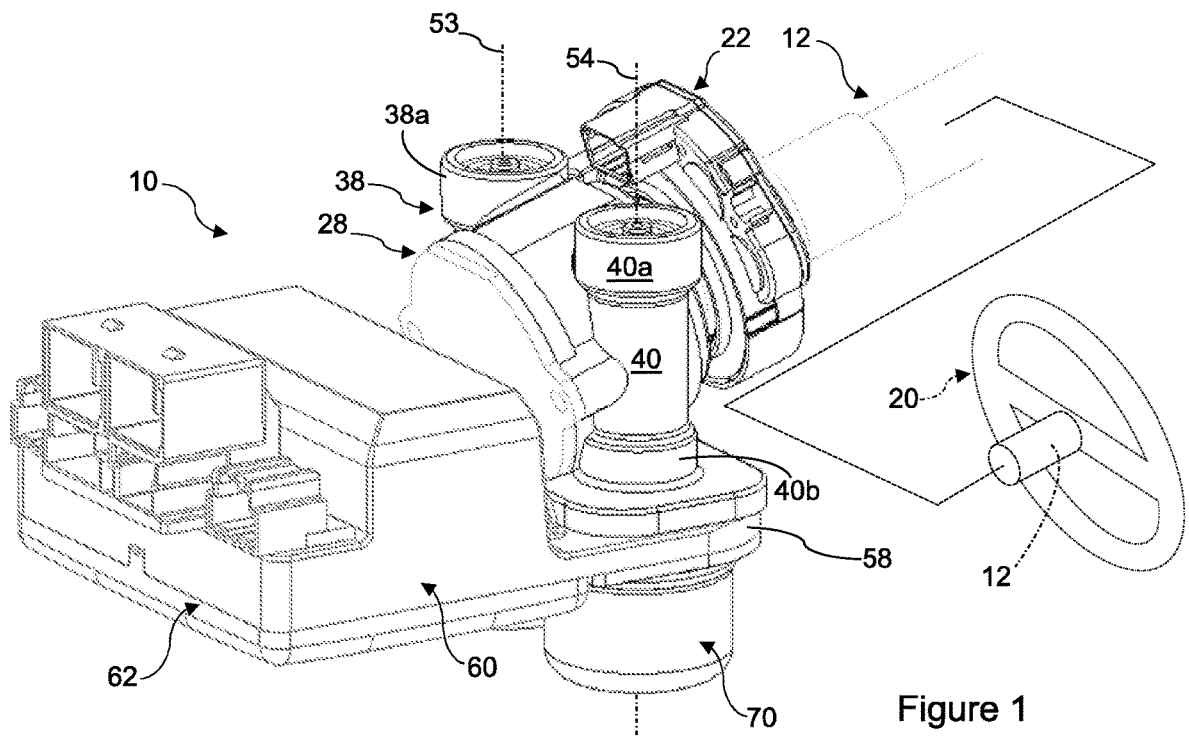
FIG. 1 is a perspective view of one end of an exemplary arrangement of a steering column assembly in accordance with the present disclosure.

A steer-by-wire steering column assembly 10 comprises a straight elongate tubular metal steering column 12 (only the lower end of which is illustrated) which is rotatably mounted about its longitudinal axis 16, for example by bearings (not illustrated). A steering wheel 20 illustrated schematically in FIG. 1 is secured to an opposite, upper end of the steering column 12, by which the steering column can be rotated by a driver. This exemplary arrangement also includes a known torque and angle sensor shown generally at 22, and FIG. 1 shows a lower end of a torsion bar 14, which forms part of the sensor. A housing of the torque and angle sensor 22 is mounted on the steering column 12, and measures the rotational position of the column 12 and the torque in the column (by measuring a relative angular displacement across the torsion bar 14), but the torsion bar 14 may be omitted so that the sensor is configured to measure only an angle of rotation of the steering column 12 (in which case there would be a direct connection between the steering column and the angle sensor).

In the drawings, the steering column 12 is shown as a single shaft, but in practice may be formed from a number of components. For example, the steering column may be formed from several telescopic parts.

Figure 5:
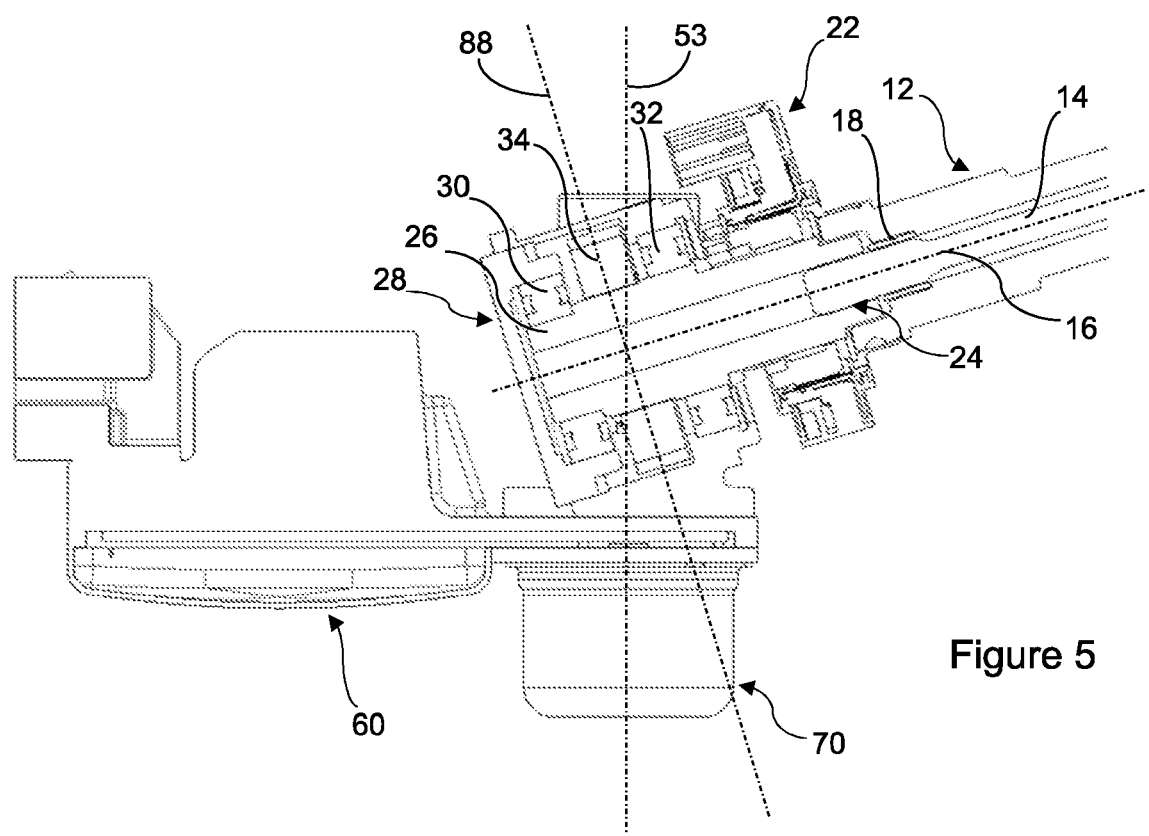
FIG. 5 is a longitudinal cross-section of the steering column assembly of FIG. 1 in a vertical plane.

As best seen in FIG. 5, the lower end of the torsion bar 14 is connected by a splined connection 24 to an elongate tubular gear support 26 which is rotatably mounted in a gear housing 28 by two bearings 30, 32 longitudinally spaced apart in the direction of the longitudinal axis 16 of the steering column 12. The steering column 12 is connected to the elongate gear support 26 via the torsion bar. A spur gear 34, i.e. a pinion gear with straight-cut teeth, is fixedly secured to the tubular gear support 26 within the housing 28 between the bearings 30, 32 and is constrained to rotate with the gear support 26, and therefore with the steering column 12 and steering wheel 18, via the torsion bar 14, around the longitudinal axis 16. As mentioned previously, the torsion bar may be omitted, so that the sensor measures only the rotation of the steering column 20, in which case there would be a direct connection (e.g. a splined connection) between the steering column 12 and the elongate gear support 26.

The gear housing 28 also has two elongate, parallel, generally tubular housing portions 38, 40 arranged one on either side of the pinion gear 34. Each of the tubular housing portions 38, 40 receives a worm screw 42, 44 mounted on a shaft 46, 48, each of which is rotatably mounted in its respective housing portion 38, 40 by upper and lower bearings 50, 52 located in radially enlarged upper 38a, 40a and lower 38b, 40b portions of the housing portions 38, 40. The rotational axes 53, 54 of the worm screw shafts 46, 48 extend parallel to each other and would normally extend substantially vertically when the steering column assembly is installed in a vehicle.

Figure 4:
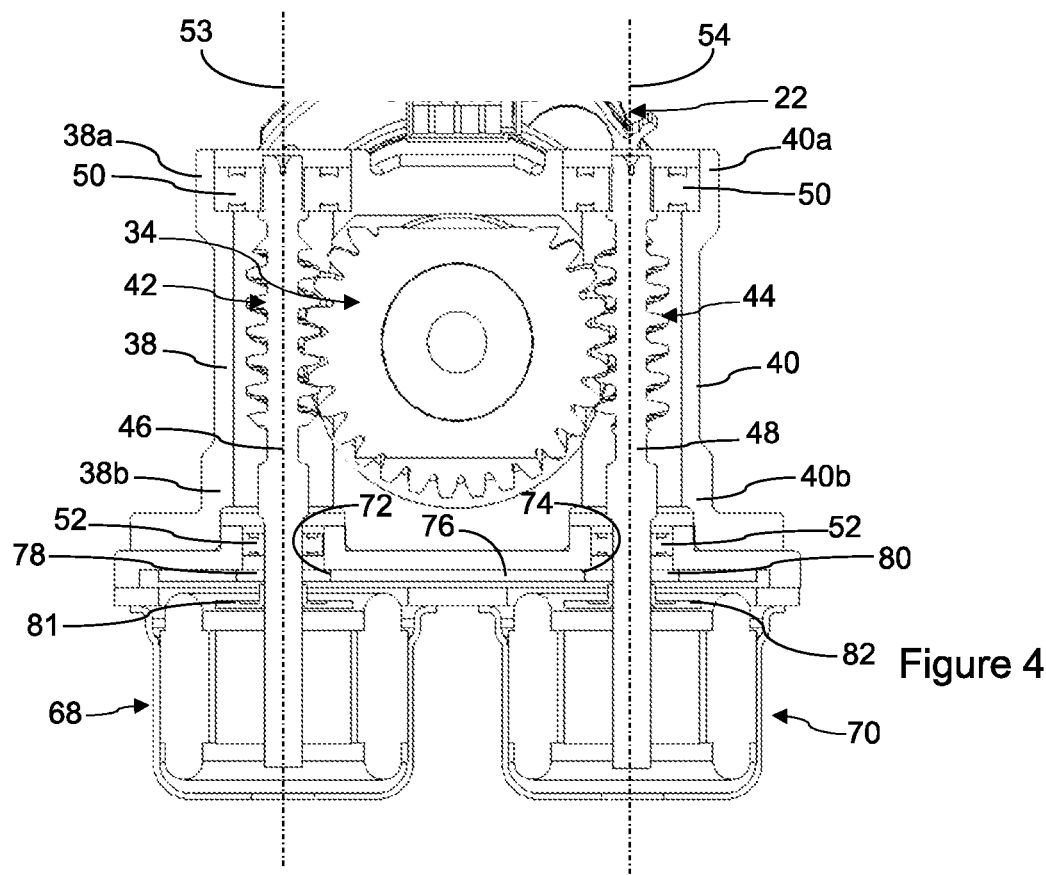
FIG. 4 is a vertical cross-section looking in the direction of arrows IV-IV of FIG. 2.

The gear housing 28 is mounted on the upper planar face 56 of a ledge 58 which forms part of a housing 60 for an ECU (electronic control unit) 62 which forms part of the steering assembly and which is located rearwardly of the lower end of the housing 12 and gear housing 28. As best seen in FIG. 4, the lower ends of the worm screw shafts 46, 48 pass perpendicularly through respective apertures 64, 66 in the ledge 58 and are connected directly to the output of a respective electric motor 68, 70 mounted on the lower face of the ledge 58, below the worm screws 42, 44. Each of the worm screw shafts 46, 48 also passes through a respective aperture 72, 74 in a PCB (printed circuit board) 76 of the ECU 62 located between the worm screws 42, 44 and the motors 68, 70, and through a respective annular motion position sensor 78, 80 mounted on the PCB and surrounding the apertures 72, 74. A respective annular MPS (motion position sensor) target magnet 81, 82 is mounted on each of the worm screw shafts 46, 48 immediately below the respective position sensor 78, 80. Each of the MPS target magnets 81, 82 rotates with its respective worm screw shaft 46, 48 and their rotational positions are detected by a respective one of the sensors 78, 80 on the PCB 76.

Figure 2:
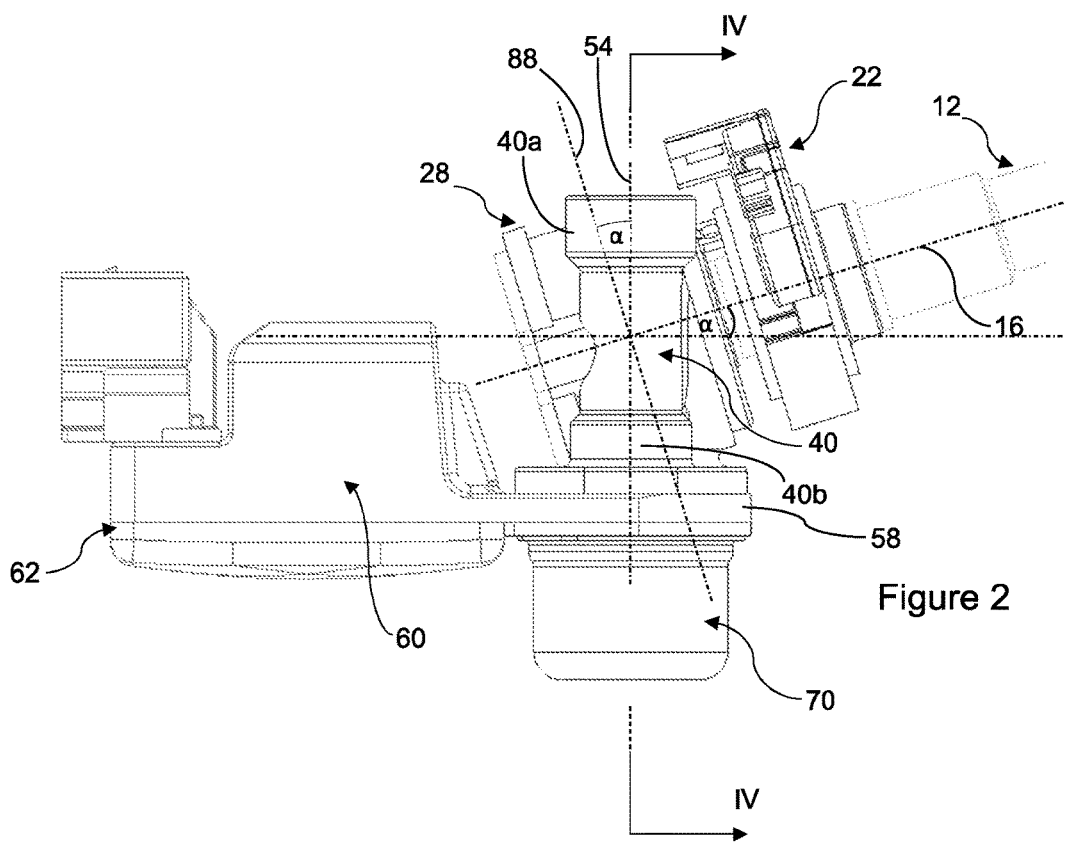
FIG. 2 is a side view of the steering column assembly of FIG. 1.
Figure 3:
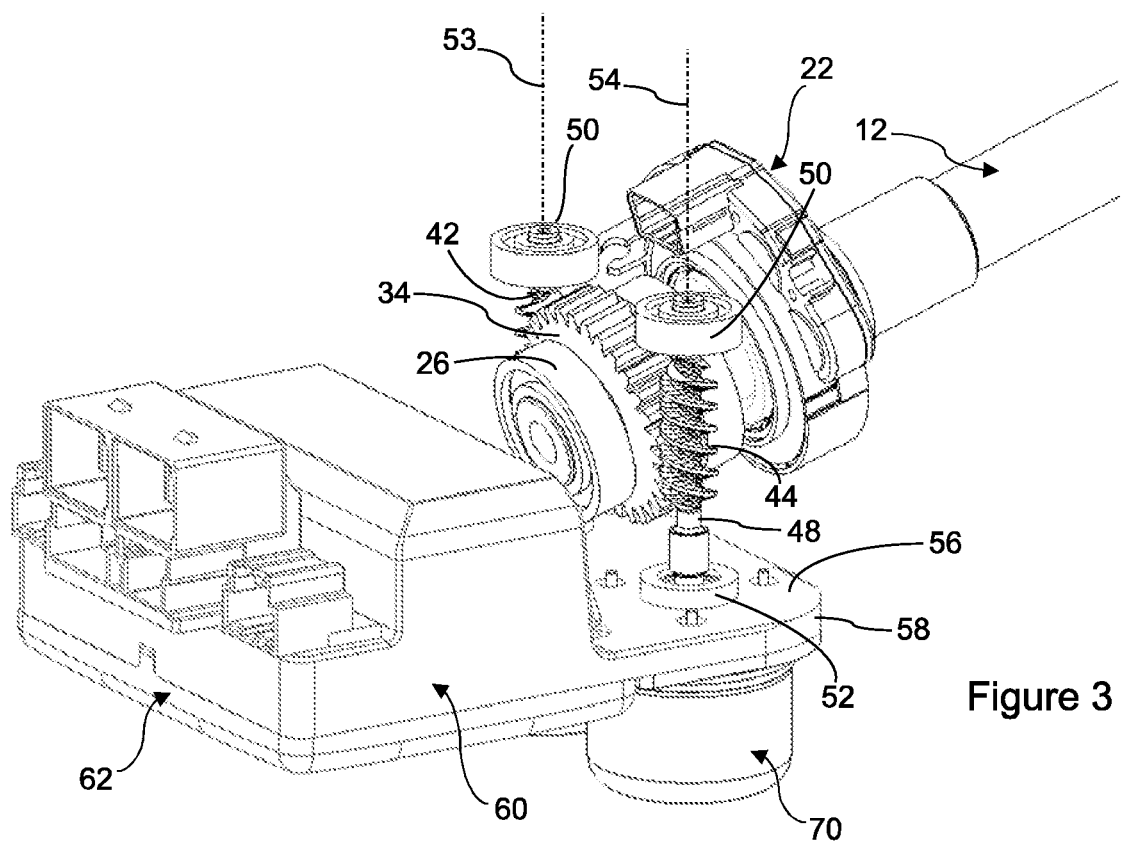
FIG. 3 is a perspective view of the steering column assembly of FIG. 1, with the gearing housings removed.

The worm screws 42, 44 are meshed with the pinion gear 34 at diametrically opposed positions on opposite sides of the pinion gear. The worm screws 42, 44 are identical and have the same helix angle, except that they have opposite-handed threads, i.e. one will be a right-handed thread and the other will be a left-handed thread. Moreover, the longitudinal (rotational) axes 53, 54 of each of the worm screw shafts 46, 48 is inclined at an angle α to a plane 88 (see FIGS. 2 and 5) extending perpendicularly to the longitudinal (rotational) axis 16 of the steering column 12. In this way, upper ends of the worm screws 42, 44 (i.e. the ends remote from the motors 60, 70) are both canted or inclined to one side of the plane 88, towards the steering wheel end of the steering column 12, and the opposite ends of the worm screws 42, 44 are canted or inclined to the other side of the plane 88, away from the steering wheel end of the steering column 12.

The angle α corresponds to a helix angle of the worm screws 42, 44, which in this exemplary arrangement is approximately 20°. This allows the steering column 12 to be inclined to the rotational axes of the worm screw shafts 46, 48, for example, at an angle α corresponding to the helix angle of the worm screws. Consequently, if the worm screw shafts 46, 48 are oriented substantially vertically within a vehicle, the steering column 12 can be inclined to the horizontal by the same angle α, corresponding to the helix angle of the worm screws 42, 44.

In use, the steering assembly 10 is installed in a vehicle with the rotational axes of the worm screws 42, 44 and their associated motors 68, 70 oriented substantially vertically, which results in the elongate housing 12 being upwardly inclined with respect to the horizontal at a rake angle α corresponding to the helix angle α of the worm screws 42, 44.

Rotation of the steering wheel 20 by a driver results in rotation of the steering column 12, which is measured in a known manner by the torque and angle sensor 22 and is used to control the orientation of the steered wheels of the vehicle by an electronic control unit in a steer-by-wire manner, i.e. without any direct mechanical connection between the steering wheel and the steered wheels. Rotation of the worm screws 42, 44 by their respective motors 68, 70 is controlled by the ECU 60 to apply feedback torque to the steering column 12 and the steering wheel 20, in order to provide a sensation of road feel to the driver. By using two worm screws 42, 44, the torque applied to each of them can be controlled in order to reduce backlash and gear rattle.

Rotation of the worm screws 42, 44 results in rotation of the annular MPS magnets 81, 82 mounted on the worm screw shafts 46, 48, which is detected by the respective motion position sensors 78, 80 on the PCB 76 And used by the ECU 60 to apply an appropriate amount of torque to the worm screws 42, 44.

The use of two worm screws 42, 44 acting on the same straight-cut gear 34 allows the rotational axes of the worm screws to be inclined with respect to the rotational axis of the steering column 12. In turn, this allows better use of the available space and allows the ECU 60 to be mounted beyond the lower end of the steering column 12 rather than below the motors 68, 70, which increases the clearance below the lower end of the steering column 12 to accommodate the feet of a driver.

The disclosure is not restricted to the details of the foregoing exemplary arrangement.

The invention claimed is:

1. A steering column assembly for a vehicle, comprising:
a steering column mounted for rotation about its longitudinal axis and configured for attachment to a steering wheel at one end;
a first gear connected to the steering column at a location spaced from the one end where the steering wheel attaches and configured to rotate with the steering column;
first and second motors;
first and second worm screws connected to and rotatable with an output of the first and second motors respectively and engaged with the first gear; and
a control arrangement configured to operate the first and second motors;
wherein the control arrangement comprises a circuit board located between the first and second worm screws and their respective motors and wherein the circuit board comprises a motor output position sensor for each of the first and second motors.

2. A steering column assembly as claimed in claim 1, wherein each of the outputs of the first and second motors passes through an aperture in the circuit board.

3. A steering column assembly as claimed in claim 2, wherein each motor output position sensor is located adjacent to the aperture through which an output of one of the motors passes.

4. A steering column assembly as claimed in claim 2, wherein each motor output position sensor is annular and the output of each of the first and second motors passes through a respective motor output position sensor.

5. A steering column assembly as claimed in claim 1, wherein the output of each of the first and second motors carries a magnet which interacts with the respective motor output position sensor.

6. A steering column assembly as claimed in claim 1, wherein the control arrangement comprises an electronic control unit located beyond the end of the steering column remote from the one end where the steering wheel is attached.

7. A steering column assembly as claimed in claim 1, wherein the first gear is connected to the steering column at an opposite end of the steering column from the steering wheel.

8. A steering column assembly as claimed in claim 1, wherein rotational axes of the first and second worm screws are inclined with respect to a plane extending perpendicular to the rotational axis of the steering column.

9. A steering column assembly as claimed in claim 8, wherein the rotational axes of the first and second worm screws are inclined at substantially the same angle.

10. A steering column assembly as claimed in claim 8, wherein the first and second worm screws have the same helix angle.

11. A steering column assembly as claimed in claim 10, wherein the first and second worm screws are oppositely-handed.

12. A steering column assembly as claimed in claim 10, wherein the rotational axes of the first and second worm screws are inclined at substantially the same angle as the helix angle of the worm screws.

13. A steering column assembly as claimed in claim 1, wherein the rotational axes of the worm screws are parallel.

14. A steering column assembly as claimed in claim 1, wherein the worm screws are positioned on opposite sides of the rotational axis of the first gear.

15. A steering column assembly as claimed in claim 14, wherein the worm screws are positioned at diametrically opposite sides of the rotational axis of the first gear.

16. A steering column assembly as claimed in claim 1, wherein the first gear is a straight-cut gear.

17. A steering column assembly as claimed in claim 1, wherein the rotational axes of the first and second worm screws are inclined towards the same side of a plane extending perpendicular to the rotational axis of the steering column.

18. A steering column assembly as claimed in claim 17, wherein ends of the first and second worm screws remote from the respective motors are inclined towards the one end of the steering column configured for attachment of a steering wheel.

19. A steering column assembly as claimed in claim 1, wherein the rotational axes of the worm screws are oriented substantially vertically in normal use.

20. A steering column assembly as claimed in claim 1, wherein the first and second motors are positioned below the first and second worm screws respectively.

21. A steering column assembly as claimed in claim 1, wherein the outputs of the first and second motors are connected directly to the first and second worm screws respectively.

22. A vehicle comprising a steering column assembly as claimed in claim 1.

23. A vehicle as claimed in claim 22, wherein the longitudinal axis of the shaft is inclined to the horizontal.

\* \* \* \* \*